United States Patent
Suzuki et al.

(10) Patent No.: US 10,495,007 B2
(45) Date of Patent: Dec. 3, 2019

(54) CONTROL DEVICE FOR INTERNAL COMBUSTION ENGINE AND CONTROL METHOD FOR INTERNAL COMBUSTION ENGINE

(71) Applicant: NISSAN MOTOR CO., LTD., Yokohama-shi, Kanagawa (JP)

(72) Inventors: Daisuke Suzuki, Kanagawa (JP); Takayuki Hamamoto, Kanagawa (JP); Tetsuya Kobara, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 30 days.

(21) Appl. No.: 15/760,389

(22) PCT Filed: Sep. 18, 2015

(86) PCT No.: PCT/JP2015/076706
§ 371 (c)(1),
(2) Date: Mar. 15, 2018

(87) PCT Pub. No.: WO2017/046949
PCT Pub. Date: Mar. 23, 2017

(65) Prior Publication Data
US 2018/0252167 A1 Sep. 6, 2018

(51) Int. Cl.
*F02D 9/02* (2006.01)
*F02M 26/15* (2016.01)
(Continued)

(52) U.S. Cl.
CPC .............. *F02D 9/02* (2013.01); *F02D 9/105* (2013.01); *F02D 41/0007* (2013.01);
(Continued)

(58) Field of Classification Search
CPC ........ F02D 9/02; F02D 9/105; F02D 41/0007; F02D 2009/0276; F02D 2041/0017;
(Continued)

(56) References Cited

U.S. PATENT DOCUMENTS

2001/0011541 A1* 8/2001 Kawasaki ................ F01L 9/04
123/568.14
2001/0042529 A1* 11/2001 Kawasaki ................ F01L 9/04
123/90.15
(Continued)

FOREIGN PATENT DOCUMENTS

EP 2 128 407 A1 12/2009
EP 3 348 818 A1 7/2018
(Continued)

OTHER PUBLICATIONS

USPTO Office Action, U.S. Appl. No. 15/75,913 dated Mar. 13, 2019, 11 pages.
(Continued)

*Primary Examiner* — Joseph J Dallo
(74) *Attorney, Agent, or Firm* — Foley & Lardner LLP

(57) ABSTRACT

An internal combustion engine includes an intake passage of the internal combustion engine, an exhaust passage of the internal combustion engine, and an EGR passage connecting the intake passage and the exhaust passage. The internal combustion engine further includes a throttle valve provided downstream of a connected part to the EGR passage in the intake passage, and configured to control an intake air quantity toward a downstream side of the connected part, and an intake throttle valve provided upstream of the connected part to the EGR passage in the intake passage. In a control device of the internal combustion engine, an opening degree of the intake throttle valve is determined on the basis of an opening degree of the throttle valve.

10 Claims, 8 Drawing Sheets

(51) Int. Cl.
   *F02D 9/10* (2006.01)
   *F02D 41/00* (2006.01)
   *F02M 26/00* (2016.01)

(52) U.S. Cl.
   CPC ..... *F02M 26/15* (2016.02); *F02D 2009/0272* (2013.01); *F02D 2009/0276* (2013.01); *F02M 2026/009* (2016.02)

(58) Field of Classification Search
   CPC ............ F02D 2009/0272; F02M 26/15; F02M 2026/009; Y02T 10/47
   See application file for complete search history.

(56) References Cited

U.S. PATENT DOCUMENTS

| | | | |
|---|---|---|---|
| 2005/0092292 A1* | 5/2005 | Kamimura | F02D 9/105 |
| | | | 123/396 |
| 2008/0264045 A1* | 10/2008 | Hara | F01N 3/0222 |
| | | | 60/295 |
| 2009/0194079 A1 | 8/2009 | Nagae et al. | |
| 2009/0223221 A1 | 9/2009 | Onishi et al. | |
| 2010/0050999 A1 | 3/2010 | Murata et al. | |
| 2010/0126142 A1 | 5/2010 | Murata et al. | |
| 2010/0179745 A1 | 7/2010 | Nakayama et al. | |
| 2010/0211294 A1 | 8/2010 | Soejima | |
| 2012/0037134 A1 | 2/2012 | Jankovic et al. | |
| 2012/0095664 A1 | 4/2012 | Nakamura et al. | |
| 2014/0202436 A1 | 7/2014 | Inagaki et al. | |
| 2015/0211447 A1 | 7/2015 | Takaki | |
| 2017/0015326 A1* | 1/2017 | Iwata | F02D 29/02 |
| 2017/0356361 A1* | 12/2017 | Yamaguchi | F02D 41/123 |
| 2018/0258871 A1 | 9/2018 | Hamamoto | |

FOREIGN PATENT DOCUMENTS

| | | |
|---|---|---|
| JP | 2008-175139 A | 7/2008 |
| JP | 2008-248729 A | 10/2008 |
| JP | 2012-47093 A | 3/2012 |
| JP | 2014-125980 A | 7/2014 |
| JP | 2015-124685 A | 7/2015 |
| WO | WO-2014/020982 A1 | 2/2014 |

OTHER PUBLICATIONS

USPTO Notice of Allowance, U.S. Appl. No. 15/759,913, dated Jul. 9, 2019, 5 pages.

* cited by examiner

CONTROL DEVICE FOR INTERNAL COMBUSTION ENGINE AND CONTROL METHOD FOR INTERNAL COMBUSTION ENGINE

TECHNICAL FIELD

The present invention relates to a control device for internal combustion engine and a control method for internal combustion engine.

BACKGROUND ART

It is disclosed in JP2012-47093A to provide an intake throttle valve on an upstream side of a connection point to an EGR passage in an intake passage and provide a pressure sensor for detecting a pressure near the connection point of the EGR passage. A feedback control for manipulating an intake throttle valve opening degree is executed so that the pressure detected via the pressure sensor reaches a predetermined target value slightly lower than an atmospheric pressure. In this way, EGR gas is introduced into the intake passage from the EGR passage.

SUMMARY OF INVENTION

In the above technique, since the intake throttle valve opening degree is manipulated according to the pressure detected by the pressure sensor, the pressure sensor having high accuracy needs to be used and cost is accordingly increased. If a pressure sensor having low accuracy is used, the controllability of the intake throttle valve opening degree is reduced due to a correspondingly low resolution. If it is tried to reliably introduce the EGR gas under such a situation, a control has to be executed with a target value of a differential pressure between an exhaust passage and the intake passage set to be larger than an actually necessary differential pressure. In such a case, an intake throttle quantity by the intake throttle valve also increases, wherefore pumping loss also increases. The occurrence of the pumping loss has a problem of causing an output reduction of an internal combustion engine.

The present invention aims to properly introduce EGR gas while suppressing an output reduction.

In one aspect of the present invention, an internal combustion engine includes an intake passage of the internal combustion engine, an exhaust passage of the internal combustion engine, and an EGR passage connecting the intake passage and the exhaust passage. The internal combustion engine further includes a throttle valve provided downstream of a connected part to the EGR passage in the intake passage, and configured to control an intake air quantity toward a downstream side of the connected part, and an intake throttle valve provided upstream of the connected part to the EGR passage in the intake passage. Here, in a control device of the internal combustion engine, an opening degree of the intake throttle valve is determined on the basis of an opening degree of the throttle valve.

DESCRIPTION OF EMBODIMENTS

Hereinafter, an embodiment of the present invention is described with reference to the drawings and the like.

Figure 1:
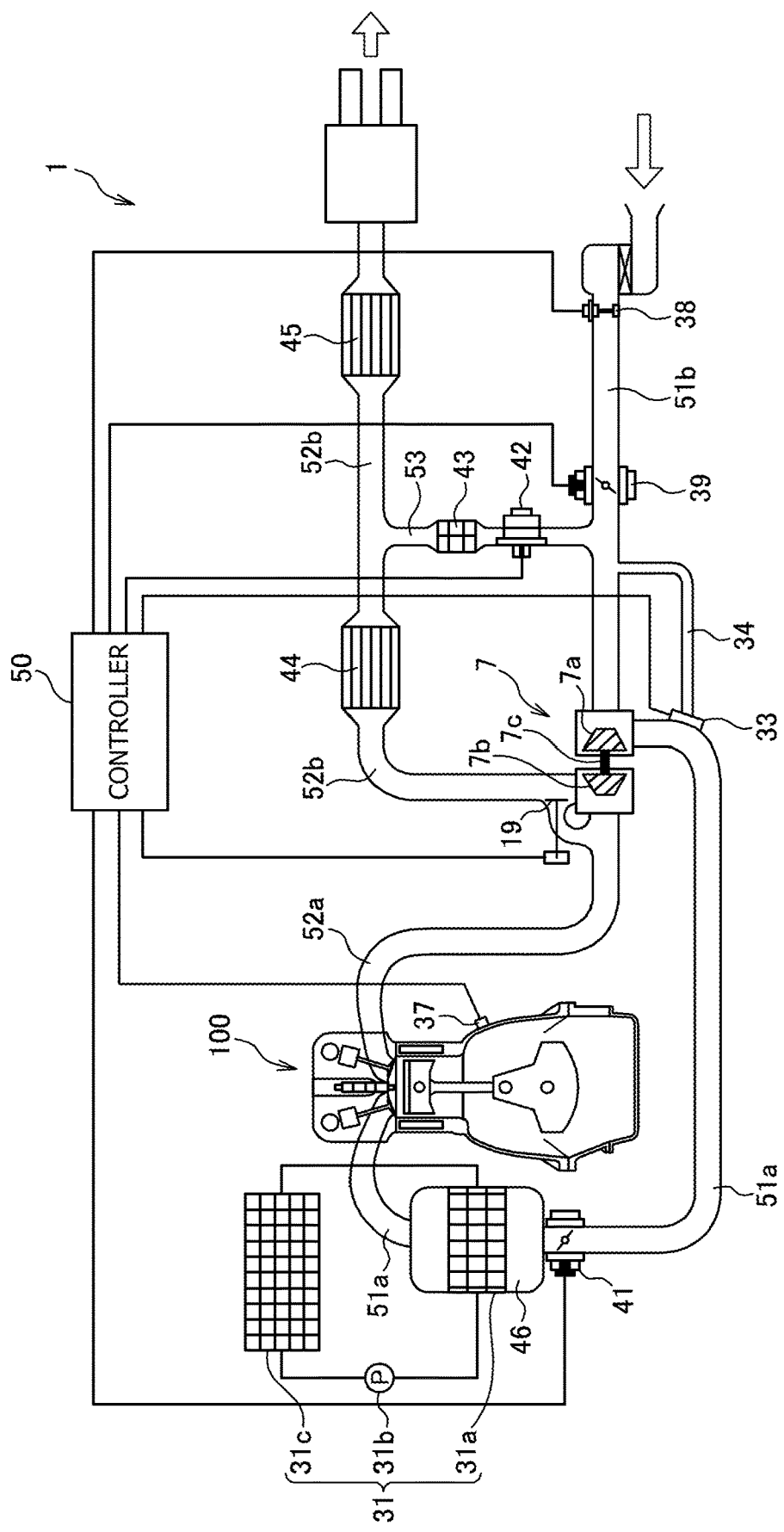
FIG. 1 is a diagram showing an entire configuration of an internal combustion system.

FIG. 1 is a diagram showing an entire configuration of an internal combustion system. An internal combustion engine 100 includes a turbo supercharger 7. The turbo supercharger 7 includes a compressor 7a and a turbine 7b connected by a shaft 7c. The compressor 7a is disposed in an intake passage 51a of the internal combustion engine 100. The turbine 7b is disposed in an exhaust passage 52a of the internal combustion engine 100. In this way, if the turbine 7b is rotated by exhaust energy of the internal combustion engine 100, the compressor 7a also rotates to supply intake air under pressure to a downstream side.

Further, the internal combustion engine 100 includes a crank angle sensor 37. The crank angle sensor 37 detects a crank angle in the internal combustion engine 100. The crank angle sensor 37 is connected to a controller 50 and the controller 50 can obtain the crank angle of the internal combustion engine 100. In this way, the controller 50 can obtain, for example, a revolution speed of the internal combustion engine 100.

Further, an electronically controlled throttle 41 is provided downstream of the compressor 7a in the intake passage 51a of the internal combustion engine 100 and a throttle opening degree is controlled by the controller 50. Further, a collector tank 46 is provided downstream of the electronically controlled throttle 41. An air cooler 31a is provided in the collector tank 46. A pump 31b for circulating cooling water and a sub-radiator 31c are connected to the air cooler 31a, and these constitute a water-cooled intercooler.

A recirculation passage 34 is branched from an intake passage 51b and connected to the intake passage 51a. The recirculation passage 34 bypasses the compressor 7a. A recirculation valve 33 is provided in the recirculation passage 34 and controlled to be opened and closed by the controller 50. By controlling the opening and closing of the recirculation valve 33, a boost pressure downstream of the compressor 7a is adjusted not to excessively increase.

Further, an air flow meter 38 is provided upstream of the compressor 7a in the intake passage 51b. The air flow meter 38 is connected to the controller 50. The controller 50 obtains the quantity of intake air passing in the intake passage 51b.

The exhaust passage 52a is provided with a bypass passage bypassing the turbine 7b. A wastegate valve 19 for controlling the opening and closing of this bypass passage is provided. The wastegate valve 19 is controlled to be opened and closed by the controller 50.

Exhaust catalysts 44, 45 for exhaust purification are provided in an exhaust passage 52b. Three-way catalysts or the like are used as the exhaust catalysts 44, 45.

The intake passage 51b and the exhaust passage 52b are connected via an EGR passage 53. An EGR cooler 43 is provided in the EGR passage 53. Further, an EGR valve 42 is provided in the EGR passage 53. The EGR valve 42 is connected to the controller 50. An opening degree of the EGR valve 42 is controlled by the controller 50 according to an operating condition of the internal combustion engine 100.

An admission valve (equivalent to an intake throttle valve, expressed by "ADM/V" in the drawings and the like in some cases) 39 is provided between a connected part to the EGR passage 53 and the air flow meter 38 in the intake passage 51b. The admission valve 39 is controlled to be opened and closed by the controller 50 and produces a differential pressure between the intake passage 51b and the exhaust passage 52b. By this differential pressure, EGR gas is more easily introduced into the intake passage 51b from the exhaust passage 52b. It should be noted that the admission valve 39 is fully open in a default state thereof and operated in a closing direction by being controlled by the controller 50.

It should be noted that the admission valve 39 is exclusively engaged in setting a negative pressure in the intake passage 51b as against the exhaust passage 52b. On the other hand, the EGR valve 42 is exclusively engaged in a control of introducing the EGR gas. The control of the EGR valve 42 is performed based on a map indicating the opening degree of the EGR valve 42 in relation to the revolution speed and load of the internal combustion engine 100.

The controller 50 reads outputs from various sensors described above and unillustrated other sensors and controls an ignition timing, an air-fuel ratio and the like on the basis of these. Further, the controller 10 executes an admission valve control to be described later.

Figure 2:
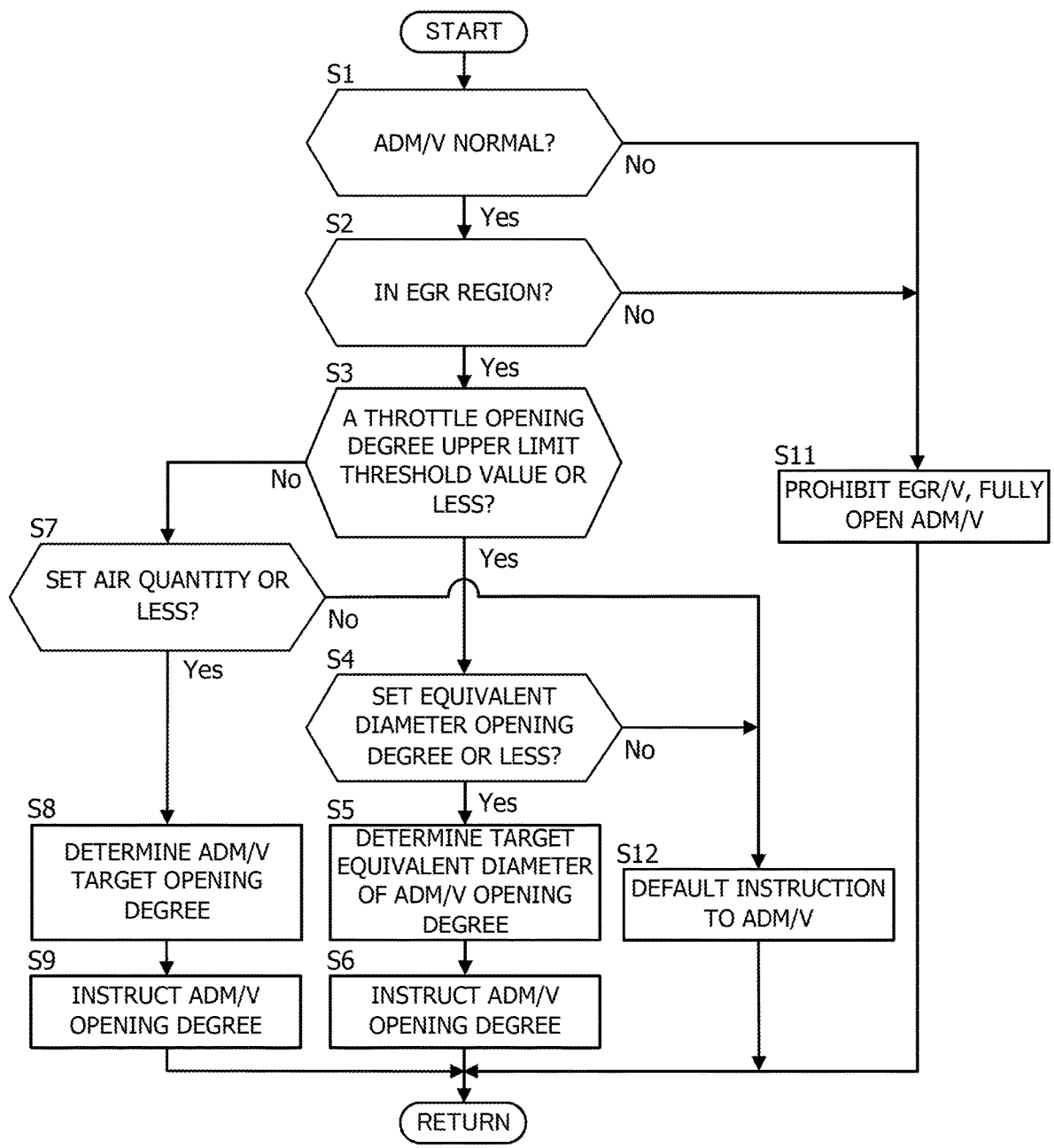
FIG. 2 is a flow chart of an admission valve control.

FIG. 2 is a flow chart of the admission valve control. This control routine is performed by the controller 50. This routine is repeatedly performed, for example, at a short interval of about 10 msec.

The controller 50 determines whether or not the admission valve 39 is in a normal state (S1). Examples of a case where the admission valve 39 is not in the normal state include a case where a butterfly valve of the admission valve 39 is fixed at a specific position.

If the admission valve 39 is not in the normal state, the controller 50 prohibits the operation of the EGR valve 42 in Step S11. Further, the controller 50 fully opens the admission valve 39 in Step S11. To prohibit the operation of the EGR valve 42, it is, for example, possible to adopt a technique for setting a value for prohibiting the operation in a flag for prohibiting the operation of the EGR valve 42.

On the other hand, if the admission valve 39 is in the normal state in Step S1, the controller 50 determines whether or not the current operating region is an EGR region (S2).

Figure 3:
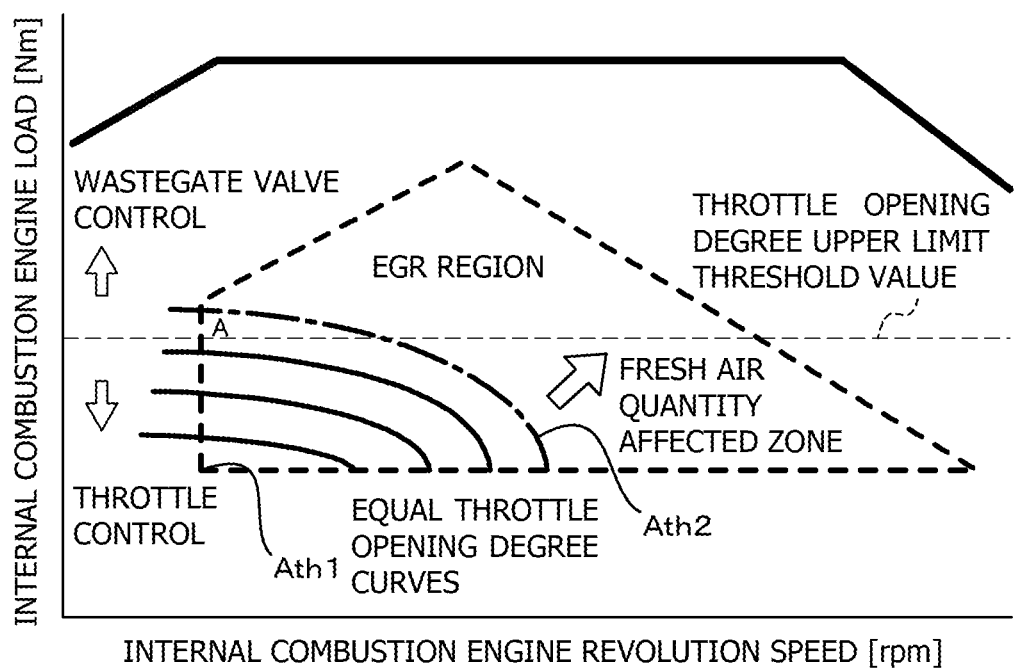
FIG. 3 is a graph of equal throttle opening degree curves.

FIG. 3 is a graph of equal throttle opening degree curves. In the graph of FIG. 3, a horizontal axis represents an internal combustion engine revolution speed and a vertical axis represents an internal combustion engine load. An output characteristic of the internal combustion engine 100 is shown by a solid line and the EGR region is enclosed by a broken line in FIG. 3. The EGR region is a region where the EGR valve 42 is operated to enable the EGR gas to be introduced into the intake passage 51b from the exhaust passage 52b.

Further, the equal throttle opening degree curves are shown in a part of the EGR region. Further, a boundary line to a fresh air quantity affected zone is shown by a dashed-dotted line. A region obliquely to the right of and above the dashed-dotted line, out of the EGR region, is the fresh air quantity affected zone. A region where the equal throttle opening degree curves are shown in FIG. 3 is a region where a suitable negative pressure can be generated in the intake passage 51b as against the exhaust passage 52b by controlling the admission valve 39 to a closing side. On the other hand, the fresh air quantity affected zone is a region where pumping loss by the admission valve 39 is large to notably affect a reduction of a fresh air introducing quantity if the admission valve 39 is controlled to the closing side.

The controller 50 obtains the revolution speed of the internal combustion engine 100 and the load of the internal combustion engine 100 and determines from these whether or not the current operating state is in the EGR region shown in FIG. 3. Whether or not the current operating state is in the EGR region is determined in this way because the admission valve 39 is controlled to the closing side only in a partial region of the EGR region. It should be noted that the controller 50 can obtain the revolution speed of the internal combustion engine 100 on the basis of a signal from the crank angle sensor 37. Further, the controller 50 can obtain the load of the internal combustion engine 100 on the basis of a depression amount of an unillustrated accelerator pedal.

If the current operating region is determined not to be the EGR region in Step S2, the controller 50 performs Step S11. Since the operation of Step S11 is already described, the description thereof is omitted.

If the current operating region is determined to be the EGR region in Step S2, the controller 50 determines whether or not the opening degree of the electronically controlled throttle 41 is equal to or smaller than a throttle opening degree upper limit threshold value (S3). The throttle opening degree upper limit threshold value is an upper limit throttle opening degree at which a correlation between the opening degree of the electronically controlled throttle and an intake air quantity is maintained. In the internal combustion engine with the supercharger, if a boost pressure increases beyond an atmospheric pressure, the intake air quantity further increases even if the electronically controlled throttle 41 is fully open. That is, there is no more correlation between the opening degree of the electronically controlled throttle 41 and the intake air quantity.

If the opening degree of the electronically controlled throttle 41 is equal to or smaller than the throttle opening degree upper limit threshold value in an operating range of the admission valve 39, the intake air quantity can be controlled by controlling the opening degree of the electronically controlled throttle 41. That is, as described later, an admission valve opening degree equivalent diameter can be determined on the basis of a throttle opening degree equivalent diameter of the electronically controlled throttle 41 (Steps S4 to S6, throttle control of FIG. 3). Here, the equivalent diameter is a representative length indicating to which circular tube of which length a flow passage is equivalent in terms of fluidity.

However, if the opening degree of the electronically controlled throttle 41 is larger than the throttle opening degree upper limit threshold value in the operating range of the admission valve 39, the intake air quantity cannot be controlled by controlling the opening degree of the electronically controlled throttle 41. In this case, the intake air quantity is controlled by controlling the opening/closing of the wastegate valve 19 (wastegate valve control of FIG. 3). For example, the boost pressure can be increased to increase the intake air quantity by closing the wastegate valve 19, and the intake air quantity can be decreased by opening the wastegate valve 19. Thus, if the opening degree of the electronically controlled throttle 41 is larger than the throttle opening degree upper limit threshold value, the opening degree of the admission valve 39 is determined on the basis of a target intake air quantity as described later (Steps S7 to S9).

It should be noted that a throttle opening degree upper limit threshold value varies depending on the specification of a supercharger and the like and a value smaller than a fully open value of an electronically controlled throttle may be set as the throttle opening degree upper limit threshold value. A case where the throttle opening degree upper limit threshold value is smaller than a fully open value of the electronically controlled throttle 41 is described in the present embodiment.

A region where the opening degree of the admission valve 39 is determined on the basis of the target intake air quantity is a region indicated by "A" of FIG. 3. Specifically, this is a region where the operating state is in the EGR region and the equal throttle opening degree curve is equal to or larger than the throttle opening degree upper limit threshold value and equal to or smaller than a set equivalent diameter to be described later (in or below the fresh air quantity affected zone).

If the opening degree of the electronically controlled throttle 41 is equal to or smaller than the throttle opening degree upper limit threshold value, the controller 50 determines whether or not the opening degree of the electronically controlled throttle 41 is equal to or smaller than an opening degree corresponding to the set equivalent diameter (S4). Here, the set equivalent diameter is the equal throttle opening degree curve shown by a dashed-dotted line, which is a boundary line to the fresh air quantity affected zone shown in FIG. 3. Specifically, the set equivalent diameter represents an air quantity at which the influence of pumping loss due to the throttling of the intake air by the admission valve 39 becomes large and the fresh air introducing quantity is affected if the opening degree of the electronically controlled throttle 41 is increased beyond this set equivalent diameter. Particularly, in the case of using the turbo supercharger 7, it is desirable to suck more air. Thus, in the present embodiment, the set equivalent diameter is set which is unlikely to affect the fresh air introducing quantity even if the turbo supercharger 7 is used.

Among the equal throttle opening degree curves of FIG. 3, the equal throttle opening degree curve closer to a right-upper side represents a larger opening degree. While the opening degree of the electronically controlled throttle 41 is small and the intake air quantity itself is small, the intake air quantity itself is not large. Since the intake air quantity itself is not large as just described, even if the admission valve 39 is controlled to the closing side, it does not cause much resistance to the intake air. Therefore, while the opening degree of the electronically controlled throttle 41 is small, the admission valve 39 can be set to the closing side.

However, if the opening degree of the electronically controlled throttle 41 increases, large pumping loss is created due to an increase in the intake air quantity if the admission valve 39 is set to the closing side. On the other hand, if the admission valve 39 is kept fully open due to an increase in the intake air quantity, the revolution speed of the internal combustion chamber 100 also increases and the rotation speed of the turbo supercharger 7 also increases. As a result, an exhaust pressure can be increased and, even if the admission valve 39 is fully opened, the EGR gas can be introduced into the intake passage 51b from the exhaust passage 52b in the EGR region. Therefore, if the opening degree of the electronically controlled throttle 41 exceeds the opening degree corresponding to the set equivalent diameter, it is preferable to fully open the admission valve 39.

Thus, the controller 50 determines whether or not the opening degree of the electronically controlled throttle 41 is equal to or smaller than the opening degree corresponding to the set equivalent diameter. Then, the admission valve 39 is fully opened according to that determination result (Step S12 to be described later) or the opening degree of the admission valve 39 is determined according to a target equivalent diameter (Step S5 to be described later).

Unless the opening degree of the electronically controlled throttle 41 is equal to or smaller than the opening degree corresponding to the set equivalent diameter in Step S4, the controller 50 gives a default instruction to the admission valve 39 (S12). In the default instruction, the controller 50 turns off the supply of power to the admission valve 39 and fully opens the admission valve 39. Further, the controller 50 instructs the EGR valve 42 to permit the operation. A technique for setting a value for not prohibiting the operation of the EGR valve 42 in the flag for prohibiting the operation of the EGR valve 42 is, for example, known as a technique for instructing the EGR valve 42 to permit the operation. In this case, the introduction of the EGR gas is controlled only by controlling the EGR valve 42 after the admission valve 39 is fully opened.

On the other hand, if the opening degree of the electronically controlled throttle 41 is equal to or smaller than the opening degree corresponding to the set equivalent diameter in Step S4, the controller 50 determines the target equivalent diameter of the admission valve 39 (S5).

Figure 4:
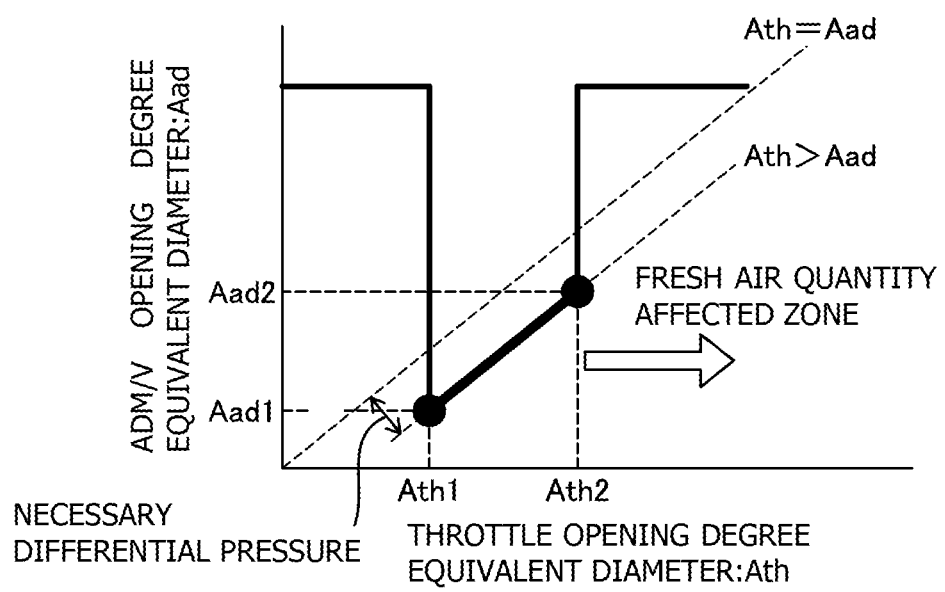
FIG. 4 is a graph showing a relationship between a throttle opening degree equivalent diameter and an admission valve opening degree equivalent diameter.

FIG. 4 is a graph showing a relationship between the throttle opening degree equivalent diameter and the admission valve opening degree equivalent diameter. In the graph of FIG. 4, a horizontal axis represents a throttle opening degree equivalent diameter Ath and a vertical axis represents an admission valve opening degree equivalent diameter Aad. Here, the throttle opening degree equivalent diameter Ath is an equivalent diameter corresponding to the opening degree of the electronically controlled throttle 41. Further, a target equivalent diameter of the admission valve opening degree is shown by a solid line in FIG. 4.

Further, a line segment when the throttle opening degree equivalent diameter Ath and the admission valve opening degree equivalent diameter Aad are equal is shown by a broken line in FIG. 4. When the throttle opening degree equivalent diameter Ath and the admission valve opening degree equivalent diameter Aad are equal, the quantity of air passing through the electronically controlled throttle 41 and the quantity of air passing through the admission valve 39 are equal. Thus, a pressure in the intake passage is not a negative pressure, but substantially an atmospheric pressure. To provide a negative pressure, a necessary differential pressure is set as shown in FIG. 4. Specifically, the admission valve opening degree equivalent diameter is set smaller than the throttle opening degree equivalent diameter.

In the present embodiment, the admission valve opening degree equivalent diameter is maximized if the throttle opening degree equivalent diameter Ath is more than zero and smaller than Ath1. Further, when the throttle opening degree equivalent diameter Ath is Ath1, the admission valve opening degree equivalent diameter is set to Aad1. Further, the admission valve opening degree equivalent diameter substantially monotonously increases to Aad2 until the throttle opening degree equivalent diameter Ath reaches Ath2. When the throttle opening degree equivalent diameter Ath exceeds Ath2, the admission valve opening degree equivalent diameter is maximized again.

Ath1 denotes a minimum throttle opening degree equivalent diameter in the EGR region. Aad1 denotes the equivalent diameter of the opening degree of the admission valve 39 at which a differential pressure for realizing a target EGR rate at the throttle opening degree equivalent diameter Ath1 is obtained. Further, Ath2 denotes a maximum throttle opening degree equivalent diameter at which the deterioration of fuel economy caused by the pumping loss due to the operation of the admission valve 39 in the closing direction and an output reduction caused by suppressing the fresh air quantity are small and allowable. Aad2 denotes the equivalent diameter of the opening degree of the admission valve 39 at which a differential pressure for realizing a target EGR rate at the throttle opening degree equivalent diameter Ath2 is obtained.

The admission valve opening degree equivalent diameter Aad is partially discontinuous as just described for the following reason. First, if the throttle opening degree equivalent diameter Ath is equal to or larger than zero and smaller than Ath1, the operating state of the internal combustion engine 100 is not in the EGR region. As described above, the admission valve 39 is controlled to the closing side only in the partial region of the EGR region. Thus, when the operating state of the internal combustion engine 100 is not in the EGR region, the admission valve opening degree equivalent diameter Aad is maximized. On the other hand, if the throttle opening degree equivalent diameter is equal to or larger than Ath1 and equal to or smaller than Ath2, the exhaust pressure increases as the throttle opening degree equivalent diameter increases and the differential pressure between the exhaust passage 52b and the intake passage 51b is more easily obtained even if the admission valve 39 is not used. Thus, the equivalent diameter of the opening degree of the admission valve 39 monotonously increases.

The operating state is outside the EGR region if the throttle opening degree equivalent diameter is smaller than Ath1. The throttle opening degree equivalent diameter Ath1 is equivalent to the equal throttle opening curve having a smallest opening degree among the equal throttle opening curves shown in FIG. 3. Below Ath1, the target opening degree of the admission valve 39 is desirably set to fully open.

If the throttle opening degree equivalent diameter Ath is equal to or larger than Ath1 and equal to or smaller than Ath2, the admission valve opening degree equivalent diameter Aad corresponding to the throttle opening degree equivalent diameter Ath is set to produce a differential pressure for introducing the EGR gas into the intake passage 51b from the exhaust passage 52b. It should be noted that the differential pressure may not be constant if the throttle opening degree equivalent diameter Ath is equal to or larger than Ath1 and equal to or smaller than Ath2.

If the throttle opening degree equivalent diameter Ath becomes larger than Ath2, the operating state is in the fresh air quantity affected zone described above with reference to FIG. 3. That is, the throttle opening degree equivalent diameter Ath2 is equivalent to the equal throttle opening degree curve of the dashed-dotted line indicating the fresh air quantity affected zone out of the equal throttle opening degree curves shown in FIG. 3. Thus, in a region where the throttle opening degree equivalent diameter Ath is larger than Ath2, the equivalent diameter of the admission valve 39 is preferably maximized to suppress the pumping loss.

From the above, the target equivalent diameter of the admission valve opening degree is discontinuous at a boundary where the throttle opening degree equivalent diameter Ath is Ath1. Further, the target equivalent diameter of the admission valve opening degree is discontinuous at a boundary where the throttle opening degree equivalent diameter Ath is Ath2.

The controller 50 obtains the opening degree of the electronically controlled throttle 41 in determining the target equivalent diameter of the admission valve opening degree. Subsequently, the throttle opening degree equivalent diameter Ath is obtained from the opening degree of the electronically controlled throttle 41. The target equivalent diameter of the admission valve opening degree is obtained from the map of FIG. 4 on the basis of the obtained throttle opening degree equivalent diameter Ath.

Subsequently, the controller 50 controls the admission valve 39 to achieve an opening degree corresponding to the obtained target equivalent diameter (S6). By doing so, the differential pressure for introducing the EGR gas into the intake passage 51b from the exhaust passage 52b can be produced by controlling an opening/closing degree of the admission valve 39 according to the throttle opening degree equivalent diameter Ath. In other words, the differential pressure for introducing the EGR gas into the intake passage 51b from the exhaust passage 52b can be produced by controlling the opening/closing degree of the admission valve 39 according to the opening degree of the electronically controlled throttle 41.

Figure 5:
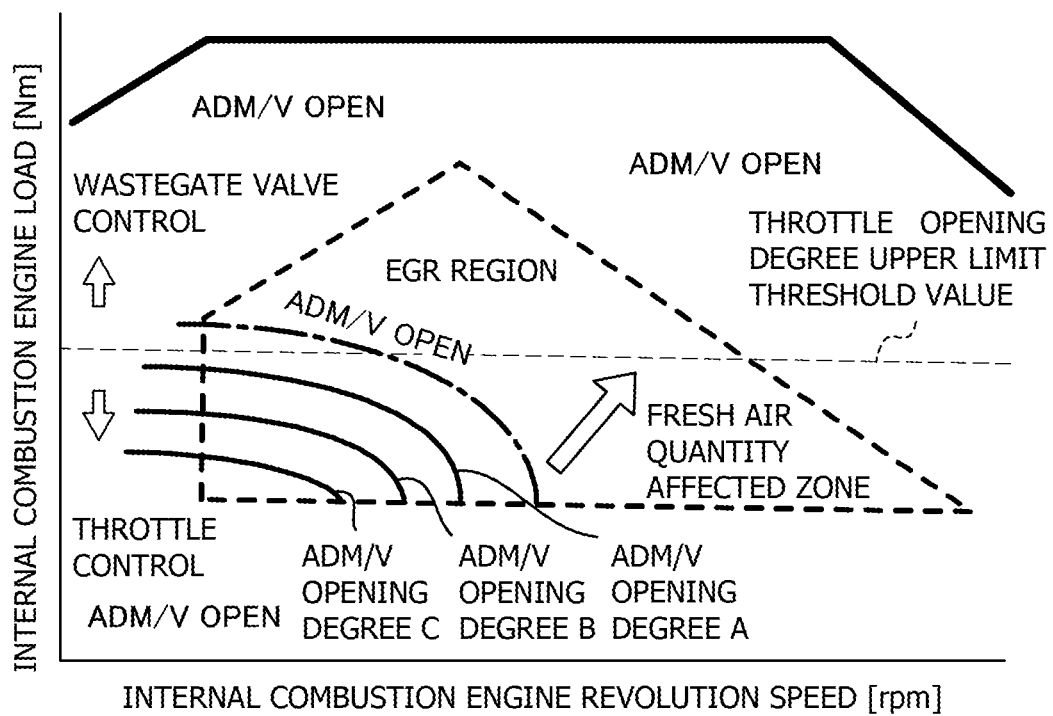
FIG. 5 is a graph of an opening degree of an admission valve by an opening degree of an electronically controlled throttle.

FIG. 5 is a graph of the opening degree of the admission valve by the opening degree of the electronically controlled throttle. In the graph of FIG. 5, a horizontal axis represents the internal combustion engine revolution speed and a vertical axis represents the internal combustion engine load. Also in FIG. 5, the output characteristic of the internal combustion engine 100 is shown by a solid line and the EGR region is shown by a broken line.

In FIG. 5, a region written as "ADM/V OPEN" is a region where the admission valve 39 is fully open. A region where the admission valve 39 is controlled to the closing side is a region within the EGR region and to the left of and below a dashed-dotted line. Here, opening degrees A, B and C are shown as the opening degrees of the admission valve 39. The opening degree B is larger than the opening degree C. and the opening degree A is larger than the opening degree B.

If FIG. 5 is compared to FIG. 3 described above, the opening degrees of the admission valve 39 in FIG. 5 coincide with the equal throttle opening degree curves in FIG. 3. This means that the target opening degree of the admission valve 39 is determined on the basis of the opening degree of the electronically controlled throttle 41. For example, it means that, even if the revolution speed of the internal combustion engine 100 differs, the target opening degree of the admission valve 39 is also set equal when the opening degree of the electronically controlled throttle 41 is an equal opening degree.

On the other hand, unless the opening degree of the electronically controlled throttle 41 is equal to or smaller than the throttle opening degree upper limit threshold value in Step S3, the controller 50 performs processings in Step S7 and subsequent Steps. In this way, a control method for the admission valve 39 is switched from a method for determination on the basis of the equivalent diameter (Steps S4 to S6) to a method for determination on the basis of the intake air quantity (Steps S7 to S9).

This switch is made for the following reason. Unless the opening degree of the electronically controlled throttle 41 is equal to or smaller than the throttle opening degree upper limit threshold value, the opening degree of the electronically controlled throttle 41 cannot be increased any further. Thus, the admission valve 39 cannot be controlled on the basis of the equivalent diameter of the electronically controlled throttle 41. Therefore, the opening degree of the admission valve 39 is determined on the basis of the target intake air quantity.

In Step S7, the controller 50 determines whether or not the target intake air quantity is equal to or less than a set air quantity (S7).

Figure 6:
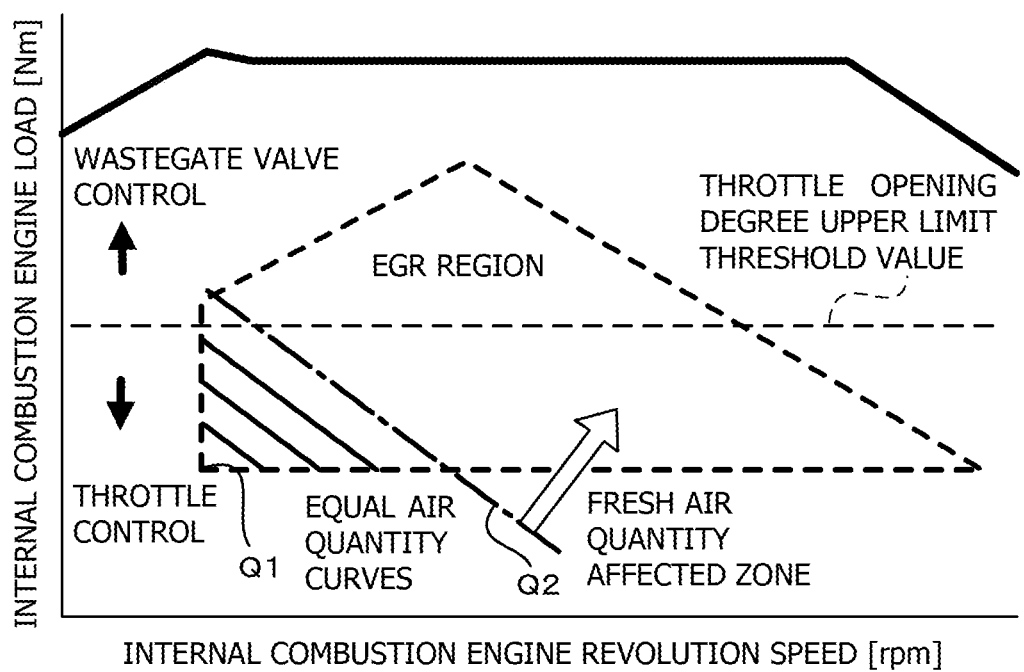
FIG. 6 is a graph of equal air quantity curves of a target intake air quantity.

FIG. 6 is a graph of equal air quantity curves of the target intake air quantity. In the graph of FIG. 6, a horizontal axis represents the internal combustion engine revolution speed and a vertical axis represents the internal combustion engine load. In FIG. 6, the output characteristic of the internal combustion engine 100 is shown by a solid line and the EGR region is shown by a broken line. The EGR region is a region where the EGR valve 42 is operated to enable the EGR gas to be introduced into the intake passage 51b from the exhaust passage 52b.

Further, the equal air quantity curves of the target intake air quantity are shown in a part of the EGR region. Further, a boundary line to the fresh air quantity affected zone is shown by a dashed-dotted line. A region oblique to the right of and above the dashed-dotted line, out of the EGR region, is the fresh air quantity affected zone. A region where the equal air quantity curves of the target intake air quantity are shown in FIG. 6 is a region where a suitable negative pressure can be generated in the intake passage 51b as against the exhaust passage 52b by controlling the admission valve 39 to the closing side. On the other hand, the fresh air quantity affected zone is a region where the pumping loss by the admission valve 39 is large to notably affect a reduction of the fresh air introducing quantity if the admission valve 39 is controlled to the closing side.

The set air quantity is an air quantity indicated by the dashed-dotted line, which is a boundary line to the fresh air quantity affected zone shown in FIG. 6. Specifically, the set air quantity is an intake air quantity at which the influence of the pumping loss becomes large and the fresh air introducing quantity is affected when the intake air is throttled by the admission valve 39 if the target intake air quantity is increased beyond this set air quantity (i.e. maximum intake air quantity at which the fresh air introducing quantity is not affected even if the intake air is throttled). Particularly, in the case of using the turbo supercharger 7, it is desirable to suck more air. Thus, in the present embodiment, the set air quantity is set which is unlikely to affect the fresh air introducing quantity even if the turbo supercharger 7 is used.

Among the equal air quantity curves of the target intake air quantity of FIG. 6, the equal air quantity curve closer to a right-upper side represents a larger air quantity. While the target intake air quantity is small, the opening degree of the electronically controlled throttle 41 is not large and the intake air quantity itself is not large. Since the intake air quantity itself is not large as just described, even if the admission valve 39 is controlled to the closing side, it does not cause much resistance to the intake air. Thus, while the target intake air quantity is small, the admission valve 39 can be set to the closing side.

However, if the target intake air quantity increases and the opening degree of the electronically controlled throttle 41 also becomes large, large pumping loss is created due to an increase in the intake air quantity if the admission valve 39 is set to the closing side. On the other hand, if the admission valve 39 is kept fully open due to an increase in the intake air quantity, the revolution speed of the internal combustion chamber 100 also increases and the rotation speed of the turbo supercharger 7 also increases. As a result, the exhaust pressure can be increased and, even if the admission valve 39 is fully opened, the EGR gas can be introduced into the intake passage 51b from the exhaust passage 52b in the EGR region. Therefore, if the target intake air quantity exceeds the set air quantity, it is preferable to fully open the admission valve 39.

Thus, the controller 50 determines whether or not the target intake air quantity is equal to or less than the set air quantity. Then, the admission valve 39 is fully opened according to that determination result (Step S12 to be described later) or the opening degree of the admission valve 39 is determined according to the target intake air quantity (Step S8 to be described later).

Unless the target intake air quantity is not equal to or less than the set air quantity in Step S7, the controller 50 gives a default instruction to the admission valve 39 (S12). In the default instruction, the controller 50 turns off the supply of power to the admission valve 39 and fully opens the admission valve 39. Further, the controller 50 instructs the EGR valve 42 to permit the operation. A technique for setting a value for not prohibiting the operation of the EGR valve 42 in the flag for prohibiting the operation of the EGR valve 42 is, for example, known as a technique for instructing the EGR valve 42 to permit the operation. In this case, the introduction of the EGR gas is controlled only by controlling the EGR valve 42 after the admission valve 39 is fully opened.

On the other hand, if the target intake air quantity is equal to or less than the set air quantity in Step S7, the controller 50 determines the target opening degree of the admission valve 39 (S8).

Figure 7:
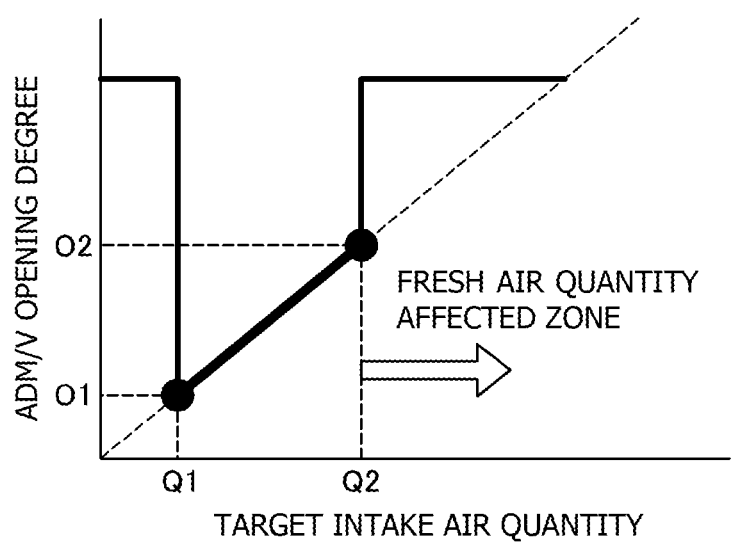
FIG. 7 is a graph showing a relationship between the target intake air quantity and the admission valve opening degree.

FIG. 7 is a graph showing a relationship between the target intake air quantity and the admission valve opening degree. In the graph of FIG. 7, a horizontal axis represents the target intake air quantity and a vertical axis represents the target opening degree of the admission valve 39. The target opening degree of the admission valve 39 is shown by a solid line in FIG. 7.

In the present embodiment, the target opening degree of the admission valve 39 is set to fully open if the target intake air quantity is equal to or more than zero and less than Q1 as shown in FIG. 7. Further, when the target intake air quantity is Q1, the target opening degree of the admission valve 39 is set to O1. Further, the target opening degree of the admission valve 39 substantially monotonously increases to O2 until the target intake air quantity reaches Q2. If the target intake air quantity exceeds Q2, the target opening degree of the admission valve 39 is set to fully open again.

Q1 denotes a minimum target intake air quantity in the EGR region. O1 denotes the opening degree of the admission valve 39 at which a differential pressure for realizing a target EGR rate at the target intake air quantity Q1 is obtained. Further, Q2 denotes a maximum target intake air quantity at which the deterioration of fuel economy caused by the pumping loss due to the operation of the admission valve in the closing direction and an output reduction caused by suppressing the fresh air quantity are small and allowable. O2 denotes the opening degree of the admission valve 39 at which a differential pressure for realizing a target EGR rate at the target intake air quantity Q2 is obtained.

The target opening degree of the admission valve 39 is partially discontinuous as just described for the following reason. First, if the target intake air quantity is equal to or more than zero and less than Q1, the operating state of the internal combustion chamber 100 is not in the EGR region. As described above, the admission valve 39 is controlled to the closing side only in the partial region of the EGR region. Thus, the target opening degree of the admission valve 39 is set to fully open when the operating state of the internal combustion chamber 100 is not in the EGR region. On the other hand, if the target intake air quantity is equal to or more than Q1 and equal to or less than Q2, the exhaust pressure increases as the target intake air quantity increases, and the differential pressure between the exhaust passage 52b and the intake passage 51b is more easily obtained even if the admission valve 39 is not used. Thus, the opening degree of the admission valve 39 monotonously increases.

The operating state is outside the EGR region if the target intake air quantity is less than Q1. The target intake air quantity Q1 is equivalent to the equal air quantity curve having a smallest air quantity out of the equal air quantity curves shown in FIG. 6. Below Q1, the target opening degree of the admission valve 39 is desirably set to fully open.

If the target intake air quantity is equal to or more than Q1 and equal to or less than Q2, the target opening degree of the admission valve 39 corresponding to the target intake air quantity is set to produce a predetermined differential pressure for introducing the EGR gas into the intake passage 51b from the exhaust passage 52b.

If the target intake air quantity becomes more than Q2, the operating state is in the fresh air quantity affected zone described above with reference to FIG. 6. That is, the target intake air quantity Q2 is equivalent to the equal air quantity curve of the dashed-dotted line indicating the fresh air quantity affected zone out of the equal air quantity curves shown in FIG. 6. Thus, in a region where the target intake air quantity is more than Q2, the target opening degree of the admission valve 39 is preferably set to fully open to suppress the pumping loss.

From the above, the target opening degree of the admission valve 39 is discontinuous at a boundary where the target intake air quantity is Q1. Further, the target opening degree of the admission valve 39 is discontinuous at a boundary where the target intake air quantity is Q2.

The controller 50 obtains the target intake air quantity in determining the target opening degree of the admission valve 39. The target intake air quantity is obtained by obtaining a required load on the basis of the depression amount of the unillustrated accelerator pedal and searching the target intake air quantity corresponding to this required load in an unillustrated map.

Then, the target opening degree of the admission valve 39 is obtained from the map of FIG. 7 on the basis of the obtained target intake air quantity.

Subsequently, the controller 50 controls the admission valve 39 to achieve the obtained target opening degree (S9). By doing so, it is possible to control the opening/closing degree of the admission valve 39 according to the target intake air quantity and produce a differential pressure for introducing the EGR gas into the intake passage 51b from the exhaust passage 52b.

Figure 8:
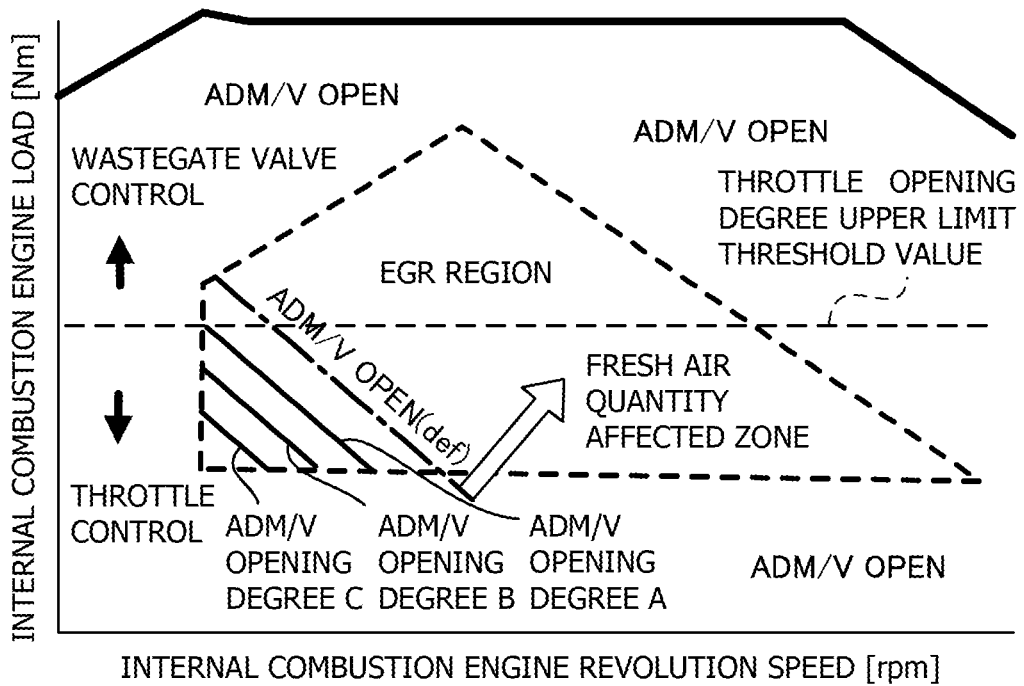
FIG. 8 is a graph showing the opening degree of the admission valve by the target intake air quantity.

FIG. 8 is a graph showing the opening degree of the admission valve by the target intake air quantity. In the graph of FIG. 8, a horizontal axis represents the internal combustion engine revolution speed and a vertical axis represents the internal combustion engine load. Also in FIG. 8, the output characteristic of the internal combustion engine 100 is shown by a solid line and the EGR region is shown by a broken line.

In FIG. 8, a region written as "ADM/V OPEN" is a region where the admission valve 39 is fully open. A region where the admission valve 39 is controlled to the closing side is a region within the EGR region and to the left of and below a dashed-dotted line shown as ADM/V OPEN (def). Here, opening degrees A, B and C are shown as the opening degrees of the admission valve 39. The opening degree B is larger than the opening degree C. and the opening degree A is larger than the opening degree B.

If FIG. 8 is compared to FIG. 6 described above, the opening degrees of the admission valve 39 in FIG. 8 coincide with the equal air quantity curves of the target intake air quantity in FIG. 6. This means that the target opening degree of the admission valve 39 is determined by the target intake air quantity. For example, it means that, even if the revolution speed of the internal combustion engine 100 differs, the target opening degree of the admission valve 39 is set equal when the target intake air quantity is an equal intake air quantity.

It should be noted that although the opening degree of the admission valve 39 is determined on the basis of the target intake air quantity here, this opening degree may be determined on the basis of an actual intake air quantity. In the case of determining the opening degree of the admission valve 39 on the basis of the actual intake air quantity, the opening degree of the admission valve 39 is determined on the basis of the intake air quantity obtained from the air flow meter 38. Further, in this case, the opening degree of the admission valve 39 is controlled on the basis of a map equivalent to that of FIG. 7.

Next, effects of the present embodiment are described.

In the present embodiment, the opening degree of the admission valve 39 is determined on the basis of the opening degree of the electronically controlled throttle 41. It is assumed that a pressure sensor is provided in the intake passage 51b and measures a pressure and the admission valve 39 is controlled by feeding back a measurement result in order to generate a negative pressure in the intake passage 51b. If it is tried to control the admission valve 39 on the basis of the value of the pressure sensor under a situation where a small differential pressure has to be produced between the intake passage 51b and the exhaust passage 52b, the pressure sensor having extremely high accuracy is necessary. That is, a resolution of the pressure sensor has to be higher than the differential pressure produced by the control of the admission valve 39.

In the case of using a pressure sensor having low accuracy, the controllability of the admission valve 39 is reduced due to a low resolution thereof. If it is tried to reliably introduce the EGR gas under such a situation, a control has to be executed with the differential pressure between the exhaust passage 52b and the intake passage 51b set to be larger than required. In such a case, an intake throttle quantity by the admission valve 39 increases, wherefore the pumping loss also increases. The occurrence of the pumping loss causes an output reduction of the internal combustion engine.

In contrast, since the admission valve 39 can be controlled on the basis of the opening degree of the electronically controlled throttle 41 according to the present embodiment, a control needs not be executed with the differential pressure between the exhaust passage 52b and the intake passage 51b set to be larger than required. Thus, the intake throttle quantity by the admission valve 39 can be set at a suitable quantity, wherefore the occurrence of the pumping loss can be suppressed to a minimum level. Then, the EGR gas can be properly introduced into the intake passage 51*b* while a reduction in the output of the internal combustion engine is suppressed.

Further, since the controller 50 of the internal combustion engine 100 controls the electronically controlled throttle 41, the opening degree of the electronically controlled throttle 41 is given as information in advance. Thus, if a map representing the relationship between the throttle opening degree equivalent diameter and the admission valve opening degree equivalent diameter is available, the admission valve 39 can be easily controlled.

Further, in the present embodiment, the opening degree of the admission valve 39 is determined by obtaining the equivalent diameter of the admission valve 39 on the basis of the equivalent diameter determined from the opening degree of the electronically controlled throttle 41. The equivalent diameter determined from the opening degree of the admission valve 39 and a resistance value for generating a negative pressure are in an equal relationship when a flow velocity is constant. Thus, if the equivalent diameter is substantially equal, a substantially equal negative pressure can be ensured. The opening degree of the admission valve 39 is grasped in advance by the controller 50 or can be detected from a position sensor, and the equivalent diameter can be easily calculated. Thus, if the controller 50 possesses the relationship between the equivalent diameter of the opening degree of the electronically controlled throttle 41 and the equivalent diameter of the opening degree of the admission valve 39, a target negative pressure can be generated by easily controlling the admission valve 39. Further, by using the equivalent diameters as indices, this control can be applied even if a diameter of each intake pipe differs.

Further, in the present embodiment, even if the operating state differs, the opening degree of the admission valve 39 is determined to be equal when the equivalent diameter determined from the opening degree of the electronically controlled throttle 41 is equal. For example, if the equivalent diameter determined from the opening degree of the electronically controlled throttle 41 is an equal equivalent diameter, the equivalent diameter of the admission valve 39 is also an equal equivalent diameter even if the revolution speed of the internal combustion engine 100 differs. In other words, if the opening degree of the electronically controlled throttle 41 is equal, the opening degree of the admission valve 39 is an equal opening degree even if the revolution speed of the internal combustion engine 100 differs. This is because the opening degree of the admission valve 39 is determined along the equal throttle opening degree curve as shown in FIGS. 3 and 5. Specifically, if the opening degree of the electronically controlled throttle 41 is same, the opening degree of the admission valve 39 can be same.

Further, in the present embodiment, the admission valve 39 is fully opened if the equivalent diameter determined from the opening degree of the electronically controlled throttle 41 is larger than an equivalent diameter determined from a predetermined opening degree. Since the admission valve 39 is provided in the intake passage, if a volumetric flow rate increases, air resistance is generated and pumping loss may occur. Such pumping loss may cause the deterioration of fuel economy and an output reduction. However, in the present embodiment, as described above, the admission valve 39 is fully opened if the equivalent diameter in the internal combustion engine 100 is equal to or larger than the equivalent diameter determined from the predetermined opening degree. Thus, the pumping loss can be reduced and the deterioration of fuel economy and the output reduction can be suppressed.

Further, in the present embodiment, if the opening degree of the electronically controlled throttle 41 is larger than the throttle opening degree upper limit threshold value in the operating range of the admission valve 39, the opening degree of the admission valve 39 is determined on the basis of the intake air quantity. If the opening degree of the electronically controlled throttle 41 is equal to or smaller than the throttle opening degree upper limit threshold value in the operating range of the admission valve 39, the opening degree of the admission valve 39 can be determined on the basis of the opening degree of the electronically controlled throttle 41. However, if the opening degree of the electronically controlled throttle 41 is larger than the throttle opening degree upper limit threshold value in the operating range of the admission valve 39, such a control cannot be executed. Accordingly, the opening degree of the admission valve 39 is determined on the basis of the intake air quantity. By doing so, even after the electronically controlled throttle 41 is fully opened, the admission valve 39 can be properly controlled by switching the control method for the admission valve 39.

Further, in the present embodiment, outside the EGR region, the admission valve 39 is fully opened as the EGR valve 42 is closed. In the present embodiment, the opening degree of the admission valve 39 is controlled in the EGR region where the EGR gas is introduced into the intake passage. Thus, by fully opening the admission valve 39 outside the EGR region, it is possible to reduce drive loss by the admission valve 39 and improve fuel economy.

Further, in the present embodiment, the opening degree of the admission valve 39 is determined on the basis of the map representing the relationship between the equivalent diameter determined from the opening degree of the admission valve 39 and the equivalent diameter determined from the opening degree of the electronically controlled throttle 41. By doing so, the controller 50 needs not have an unnecessary control logic, wherefore a simple configuration can be adopted and controllability can also be improved.

Although the embodiments of the present invention have been described above, the above embodiments are merely an illustration of some application examples of the present invention and not intended to limit the technical scope of the present invention to the specific configurations of the above embodiments.

Although each of the above embodiments has been described as a separate embodiment, these may be combined as appropriate.

The invention claimed is:

1. A control device for an internal combustion engine, comprising:
   an intake passage of the internal combustion engine;
   an exhaust passage of the internal combustion engine;
   an EGR passage connecting the intake passage and the exhaust passage;
   a throttle valve provided downstream of a connected part to the EGR passage in the intake passage, and configured to control an intake air quantity toward a downstream side of the connected part; and
   an intake throttle valve provided upstream of the connected part to the EGR passage in the intake passage, wherein
   an opening degree of the intake throttle valve is determined on the basis of an opening degree of the throttle valve such that the opening degree of the intake throttle valve is at a closed side with respect to a full-opening degree, only when the opening degree of the throttle valve is within a range in an EGR region, in which range a fresh air introducing quantity is not affected by the air throttling of the intake throttle valve.

2. The control device according to claim 1, wherein
the opening degree of the intake throttle valve is determined to monotonously increase in accordance with an increase in the opening degree of the throttle valve when the opening degree of the throttle valve is within the range in the EGR region.

3. The control device according to claim 1, wherein
a maximum opening degree of the throttle valve in the range is such an opening degree that, if the opening degree of the throttle valve is increased beyond the maximum opening degree, the fresh air introducing quantity becomes to be affected due to an increase of the pumping loss when the intake air is throttled by the intake throttle valve.

4. The control device according to claim 1, wherein
the opening degree of the intake throttle valve is determined on the basis of the opening degree of the throttle valve if the opening degree of the throttle valve is equal to or smaller than a predetermined opening degree in an operating range of the intake throttle valve, while being determined on the basis of the intake air quantity if the opening degree of the throttle valve is larger than the predetermined opening degree.

5. The control device according to claim 1, wherein
the opening degree of the intake throttle valve is determined by obtaining an equivalent diameter of the intake throttle valve on the basis of an equivalent diameter determined from the opening degree of the throttle valve.

6. The control device according to claim 5, wherein
the opening degree of the intake throttle valve is determined to be equal to the opening degree under a different operating state in which state the equivalent diameter determined from the opening degree of the throttle valve is equal.

7. The control device according to claim 1, wherein
the intake throttle valve is fully opened if an equivalent diameter determined from the opening degree of the throttle valve is larger than an equivalent diameter determined from a predetermined opening degree.

8. The control device according to claim 1 further comprising an EGR valve provided in the EGR passage, wherein
exhaust gas in the exhaust passage is introduced into the intake passage by controlling the EGR valve in an EGR region; and
the intake throttle valve is fully opened outside the EGR region.

9. The control device according to claim 1, wherein
the opening degree of the intake throttle valve is determined on the basis of a map representing a relationship between an equivalent diameter determined from the opening degree of the intake throttle valve and an equivalent diameter determined from the opening degree of the throttle valve.

10. A control method for an internal combustion engine including:
an EGR passage connecting an intake passage and an exhaust passage; and
an intake throttle valve provided upstream of a connected part to the EGR passage in the intake passage,
the control method comprising:
determining a throttle valve opening degree of an internal combustion engine when an operating state is in an EGR region; and
determining an opening degree of the intake throttle valve on the basis of an opening degree of the throttle valve such that the opening degree of the intake throttle valve is at a closed side with respect to a full-opening degree, only when the opening degree of the throttle valve is within a range in an EGR region, in which range a fresh air introducing quantity is not affected by the air throttling of the intake throttle valve.

* * * * *